United States Patent [19]
Hann et al.

[11] Patent Number: 5,242,199
[45] Date of Patent: Sep. 7, 1993

[54] THREADED TUBING CONNECTION

[75] Inventors: Volker Hann, Wendlingen; Siegfried Kramer, Hamburg, both of Fed. Rep. of Germany

[73] Assignee: Deutsche Airbus GmbH, Bremen, Fed. Rep. of Germany

[21] Appl. No.: 647,401

[22] Filed: Jan. 29, 1991

[30] Foreign Application Priority Data

Jan. 29, 1990 [DE] Fed. Rep. of Germany ....... 4002494

[51] Int. Cl.$^5$ .................. F16L 55/00; F16L 13/14
[52] U.S. Cl. .................... 285/175; 285/256; 285/259; 285/354; 285/382; 285/382.4; 285/391
[58] Field of Search .......... 285/354, 353, 382.4, 285/382.5, 384, 386, 382.7, 175, 391, 906, 256, 382, 259

[56] References Cited

U.S. PATENT DOCUMENTS

| Re. 18,840 | 5/1933 | Eastman | 285/175 X |
|---|---|---|---|
| Re. 28,457 | 7/1975 | Dawson | 285/354 |
| 599,224 | 2/1898 | DeCarie | 285/354 X |
| 1,752,976 | 4/1930 | Cowels | 285/256 |
| 2,013,293 | 9/1935 | Snell et al. | 285/354 X |
| 2,107,716 | 2/1938 | Singleton | 285/175 |
| 2,211,147 | 8/1940 | Miller | 285/256 |
| 2,410,600 | 11/1946 | Cowels | 285/256 |
| 3,169,786 | 2/1965 | Cantor | 285/382.7 X |
| 3,668,754 | 6/1972 | Boast | 285/354 X |
| 3,711,132 | 1/1973 | Nickerson | 285/382.4 |
| 3,727,948 | 4/1973 | Current | 285/391 X |
| 3,889,989 | 6/1975 | Legris | 285/382.7 X |
| 3,891,246 | 6/1975 | Hopper | 285/354 X |
| 4,147,385 | 4/1979 | van der Velden | 285/382.4 |
| 4,235,461 | 11/1980 | Nomark | 285/354 X |
| 4,676,531 | 6/1987 | Martin | 285/382.7 X |
| 4,688,318 | 8/1987 | Foucault et al. | 285/354 X |
| 4,844,517 | 7/1989 | Beiley et al. | 285/382.4 |
| 4,985,975 | 1/1991 | Austin et al. | 285/39 X |
| 5,056,831 | 10/1991 | Ho | 285/354 X |

FOREIGN PATENT DOCUMENTS

| 0062480 | 10/1982 | European Pat. Off. | 255/256 |
|---|---|---|---|
| 118349 | 3/1901 | Fed. Rep. of Germany . | |
| 186576 | 7/1907 | Fed. Rep. of Germany . | |

Primary Examiner—Eric K. Nicholson
Assistant Examiner—Heather Chun
Attorney, Agent, or Firm—Anderson Kill Olick & Oshinsky

[57] ABSTRACT

A threaded connection for tubing joints having a threaded part and a matching part fixedly connected with the tube, which embraces the tube externally and rests with an inner surface having grooves at the outer surface of the tube, wherein the fixed connection between the matching part and the tube is produced by rolling material of the tube into the grooves, the matching part 2 having at least one groove 7, 8 which is conducted in a threaded shape manner, so as to prevent failure of the tubing joint by crack formation.

6 Claims, 3 Drawing Sheets

THREADED TUBING CONNECTION

BACKGROUND OF THE INVENTION

The invention relates to a threaded connection for a tubing junction including a threaded part and a matching part fixedly connected with the tube, which embraces the tube externally and rests with an inner surface having grooves at the outer surface of the tube. The fixed connection between the matching part and the tube is produced by rolling material of the tube into the grooves.

A threaded junction of this type is used, for instance, in order to connect hydraulic lines with hydraulic apparatus. Herein the joint between the matching part involved and the hydraulic tube is produced by rolling material of the tube into grooves located on the inside surface of the matching part. These grooves extend in a circumferential direction on the inside surface of the matching part and are closed in themselves. This solution however, fails if the tubing is of a material which does not have the ductility required for the rolling process. In these cases the material of the tubing is excessively deformed, whereby hairline cracks are produced which can be discovered only with very expensive inspection procedures. Furthermore, it was observed that the junctions utilizing tubing material with very high spring back behavior, for instance, titanium do not have the required torsional strength.

SUMMARY OF THE INVENTION

Thus, it is an object of the invention to provide species conforming threaded connection so that the rolled connection between the tubing and the matching part can be produced without generating cracks and with high tightness and torsional strength if the material of the tubing has a spring back behavior which is higher than that of the usual materials.

Pursuant to this object, and others which will become apparent hereafter, one aspect of the present invention resides in a threaded joint connection in which the matching part has at least one groove which is conducted in a threaded shaped manner.

Herein it is of particular advantage that a failure of the tubing connection because of cracking is prevented.

In a further embodiment, there is only one groove so as to allow fabrication at minimum cost.

In order to show advantageous properties as far as fatigue strength and torsional strength are concerned, other embodiments of the invention include providing the matching part with two grooves, providing the grooves with pitches which can be equal or different, and providing the grooves with rotational directions which can be the same or different.

In a further embodiment, at least one undercut is arranged at the start and end of the grooves of the threaded connection so as to optimize fatigue strength.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
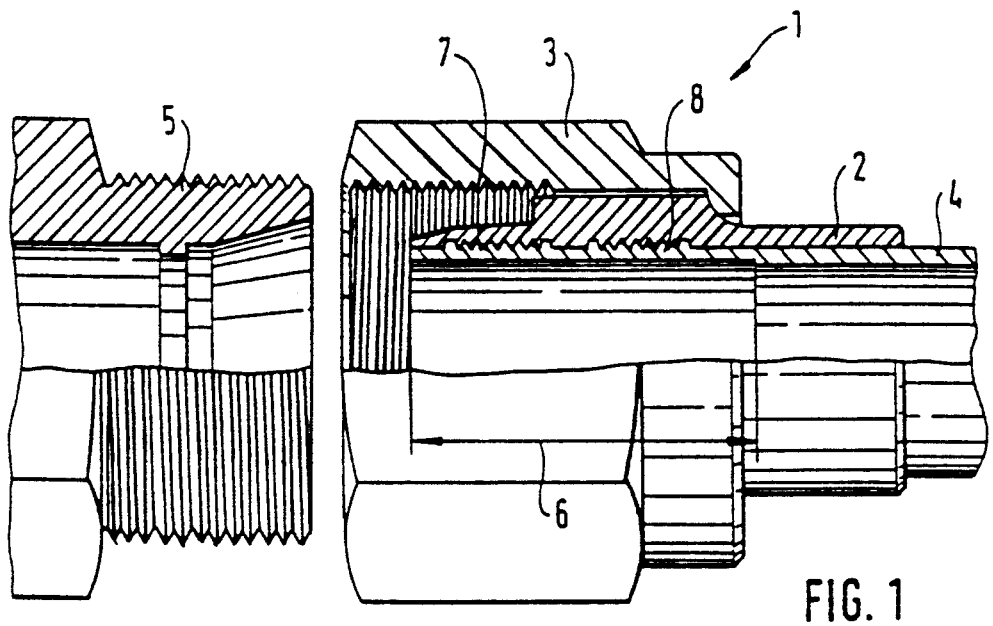
FIG. 1 shows a threaded connection pursuant to the invention.

FIG. 1 shows a threaded connection 1 consisting of a matching part 2 and a union or coupling nut 3, wherein the matching part 2 is connected with a tube 4 by a rolling process. A threaded stub 5 is located on a hydraulic appliance not shown here in detail. By screwing the union nut 3 upon the threaded stub 5 the tube 4 is connected with the appliance in a pressure-tight manner. The material of the tube 4 is pressed by a rolling process across a region 6 into grooves 7 and 8 conducted in a thread shaped manner and configured in the matching part 2, wherein the connection between the tube 4 and the matching part 2 is produced. The threaded stub 5 can also be part of a threaded junction which is configured by a rolling process on an additional tube not shown here being a match to the threaded connection 1.

Figure 2:
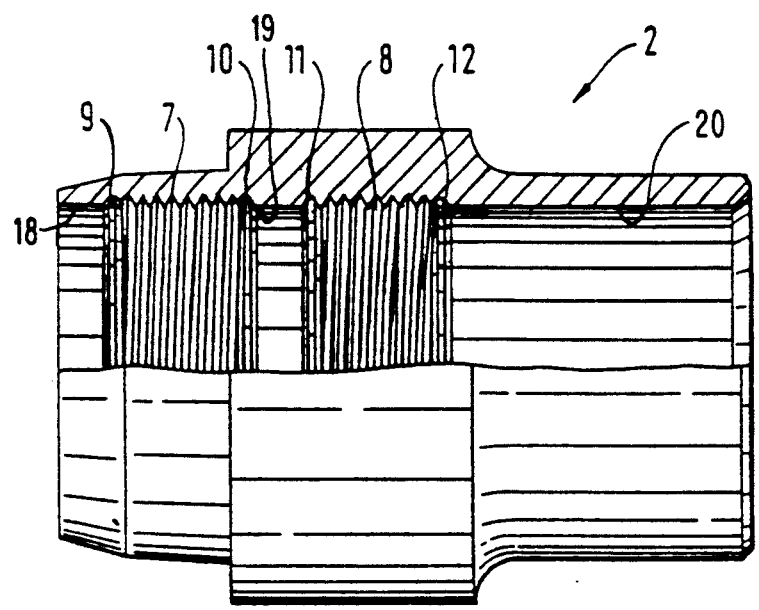
FIG. 2 shows a matching part of FIG. 1 as an individual part.

FIG. 2 shows the matching part 2 as an individual part with the grooves 7, 8 and smooth cylindrical inner surfaces 18, 19, and 20. In addition, undercuts 9 or 10 are shown here at the start and end of the groove 7 and undercuts 11 or 12 are shown at the start and at the end of the groove 8. This design fulfills indeed the highest requirement as far as fatigue strength and pressure tightness are concerned, it is however, relatively expensive as far as fabrication technology is concerned. Therefore, one will provide simpler embodiments if the requirements permit this.

Figure 3:
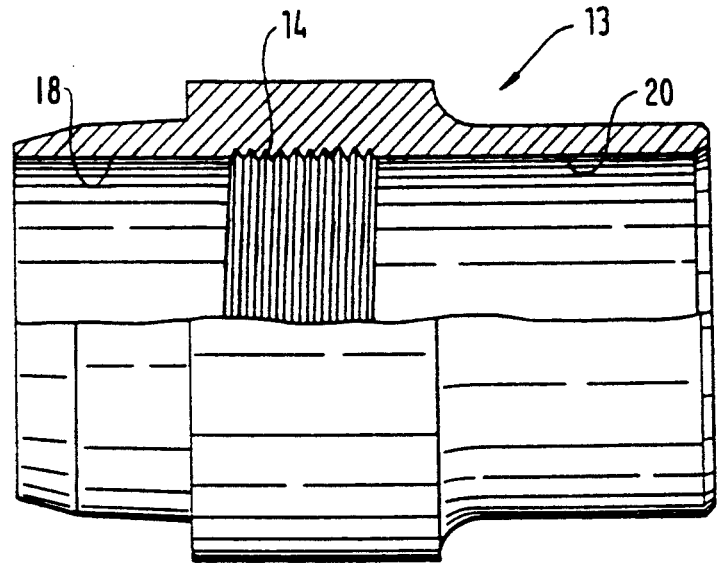
FIG. 3 show a matching part with a groove.

Therefore, FIG. 3 shows a preferred version, wherein only one thread shaped groove 14 has been worked into a matching part 13. Also, no undercuts are arranged at the start and end region of the groove 14, so that this version of the matching part can be fabricated at minimum cost.

Figure 4:
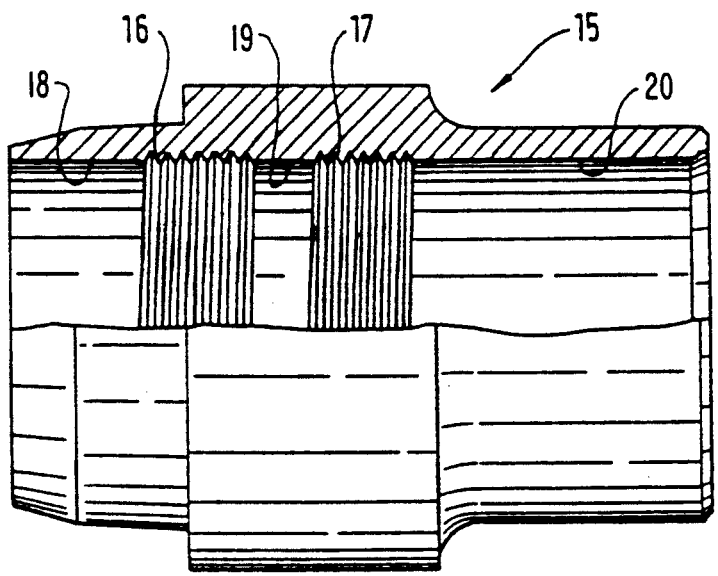
FIG. 4 shows a matching part with two grooves.
Figure 5:
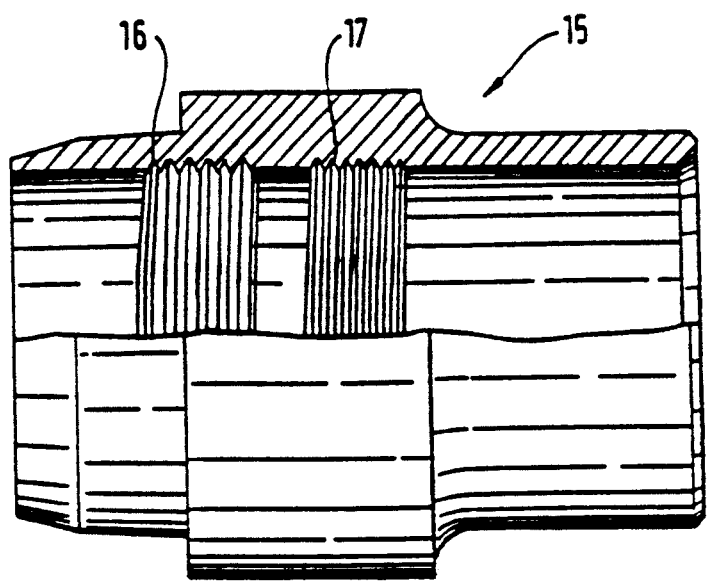
FIG. 5 shows the two grooves with different pitches.
Figure 6:
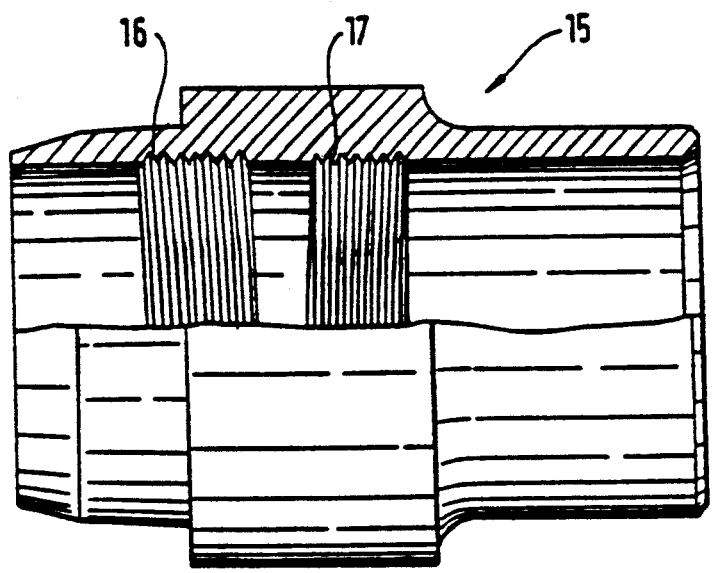
FIG. 6 shows the two grooves having different rotational directions.

FIG. 4 shows a development of the invention wherein a matching part 15 has two grooves 16 and 17. These grooves 16, 17 extend at the same pitch and in the same rotational sense. It is also conceivable that the pitches of the two grooves 16 and 17 can be different as seen in FIG. 5. Hereby the security of turning or twisting the matching part 15 with respect to the tube 4 is increased. It is furthermore conceivable that the rotational senses of the grooves 16 and 17 are different, which results in an additional increase of the security against relative rotation as seen in FIG. 6. The undercuts 9, 10, 11 and 12 in FIG. 2 are to be viewed as an additional means for increasing the security against relative rotation.

In the grooves 7, 8, 14, 16, 17 conducted in a thread shaped fashion, we are dealing for all intents and purposes, with threads which however can be freely shaped with due attention to the existing state of affairs independently of the thread standards. However, in this case, the thread profiles known from screw threads can also be used here. Thus, it is conceivable that the grooves 7, 8, 14, 16, 17 form a triangular-, rectangular-, a trapezoidal-, a saw-tooth shaped, or knuckle thread. A profile having an optimum fatigue strength can be selected from these possible thread profiles.

While the invention has been illustrated and described as embodied in a threaded tubing connection, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A tube connection, comprising a threaded part and a matching part fixedly connected with a tube, which matching part embraces the tube externally and has an inner surface that faces the tube with two sets of thread-shaped grooves into which the tube is rolled so as to fixedly connect the tube and the matching part, the matching part further having smooth cylindrical inner surfaces arranged on both sides of said grooves, which smooth surfaces have a common internal diameter and rest at an outer surface of the tube, the thread-shaped grooves having an external diameter that is larger than the internal diameter of the smooth surfaces.

2. A tube connection according to claim 1, wherein the grooves have pitches that are equal.

3. A tube connection according to claim 1, wherein the grooves have pitches that are different.

4. A tube connection according to claim 1, wherein the grooves have directions of rotation that are equal.

5. A tube connection according to claim 1, wherein the grooves have rotational directions that are different.

6. A tube connection according to claim 1, wherein at least one undercut is arranged at the start and end of each groove.

* * * * *